United States Patent
Dugle

[15] 3,657,950
[45] Apr. 25, 1972

[54] WORKPIECE DRIVE MEANS FOR TURNING LATHES

[72] Inventor: Thomas E. Dugle, Cincinnati, Ohio

[73] Assignee: Planet Products Corporation, Cincinnati, Ohio

[22] Filed: May 27, 1970

[21] Appl. No.: 51,413

Related U.S. Application Data

[62] Division of Ser. No. 710,187, Mar. 4, 1968, Pat. No. 3,605,533.

[52] U.S. Cl. .................................................. 82/8
[51] Int. Cl. .................................................. B23b 5/28
[58] Field of Search ...................................... 82/8

[56] References Cited

UNITED STATES PATENTS

| 3,079,822 | 3/1963 | Miller et al. | 82/8 X |
| 2,823,493 | 2/1958 | Stanley | 82/8 X |
| 1,522,674 | 1/1925 | Fickett | 82/8 |

FOREIGN PATENTS OR APPLICATIONS

| 874,978 | 4/1953 | Germany | 82/8 |
| 1,104,675 | 6/1955 | France | 82/8 |

Primary Examiner—Leonidas Vlachos
Attorney—J. Warren Kinney, Jr.

[57] ABSTRACT

The lathe includes opposed bodily shiftable headstocks each having a rotational spindle for engaging opposite ends of a workpiece as the headstocks are shifted toward one another. The spindles are rotated by means of two identical hydraulic pump-motors connected in a pressurized fluid piping system wherein fluid is kept in circulation by a third identical hydraulic pump-motor driven by a constant speed electric motor. By including the spindle-driving pump-motors in a common fluid system, said pump-motors are obliged to share equally the work of driving opposite ends of an elongate workpiece supported between centers on the spindles. The drive means between each spindle and one end face of the work piece, is a purely frictional drive means the effectiveness of which is aided by a high-pressure auxiliary means to elevate and maintain the force of frictional contact between the workpiece end and a unique friction-ring assembly on the spindle involving hard and soft polyurethane transmission members. The pump-motors, two of which operate as spindle drivers, while one operates as a pump delivering operating fluid to the others, are all identical and interchangeable with one another in the interests of economical maintenance and speedy replacements.

12 Claims, 4 Drawing Figures

INVENTOR
THOMAS E. DUGLE
BY
J. Warren Kinney, Jr.
ATTORNEY

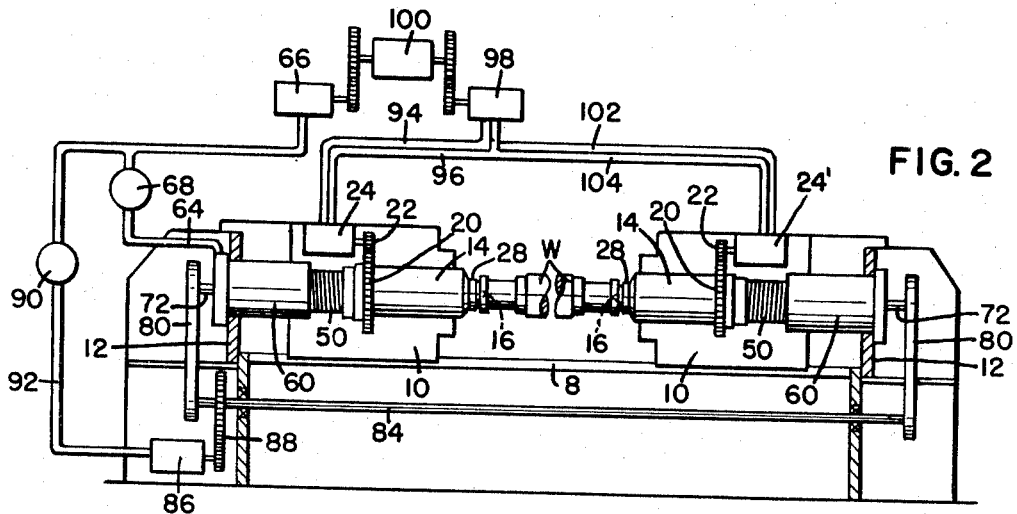
FIG. 2
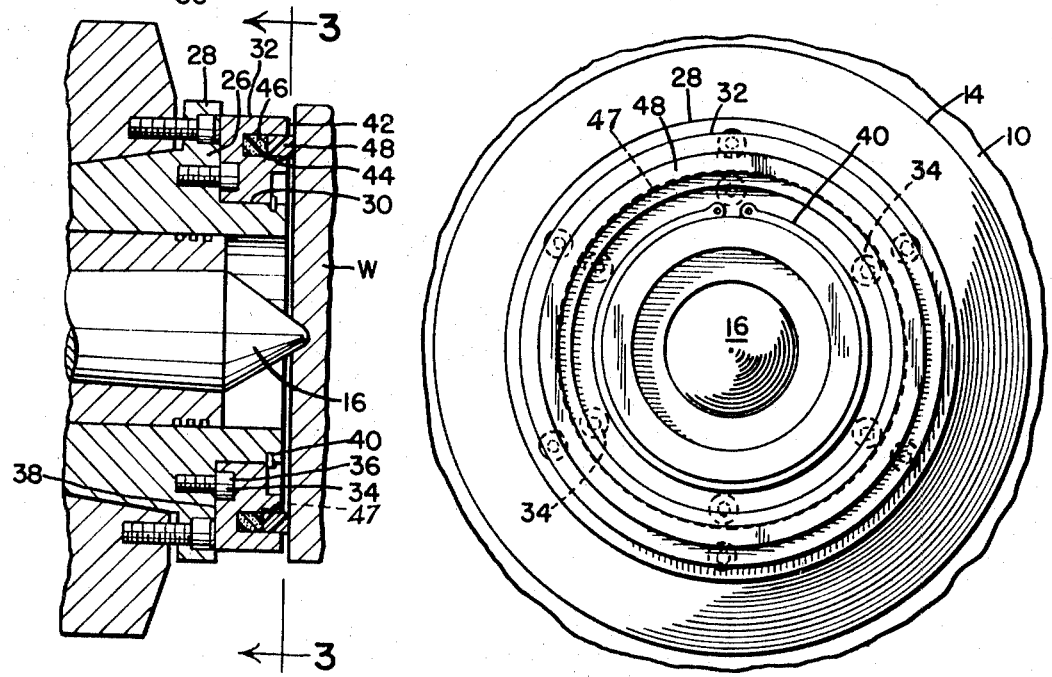
FIG. 4
FIG. 3
INVENTOR
THOMAS E. DUGLE

WORKPIECE DRIVE MEANS FOR TURNING LATHES

This is a division of application Ser. No. 710,187, filed Mar. 4, 1968, now U.S. Pat. No. 3,605,533.

The present invention relates to improvements in a workpiece drive means for turning lathes, and is applicable particularly in the machining of heavy workpieces such as railway car axles or the like which have rather large and substantially flat end faces with axial sockets receptive of the usual lathe spindle centers. The invention is useful in the machining of new or used axles or other appropriate workpieces which lend themselves to handling by the procedure hereinafter to be disclosed.

The disclosure will be directed to the machining of a railway car axle as a mere example of a workpiece type that may be accommodated, and with the understanding that the invention is not to be considered limited to car axle machining.

An object of the invention is to facilitate and expedite the mounting of a heavy workpiece between centers of a lathe, and completing the drive connection for turning the workpiece.

Another object of the invention is to provide simple, durable and effective means for transmitting rotary motion of the lathe spindle to the workpiece, without objectionable slippage and without the use of clamps which may mark the finish of the workpiece.

A further object of the invention is to provide a highly effective friction drive means for rotating workpieces in the course of a machining or finishing operation.

Another object is to provide improved highly effective means for friction-driving opposite ends of a workpiece supported between centers of two headstocks.

A still further object of the invention is to provide an improved means for hydraulically rotating the spindles of two headstocks of a lathe, with equal distribution of driving forces at opposite ends of a workpiece supported between the headstocks.

Another object is to provide improved means for comprising a workpiece between centers of two driving spindles.

The foregoing and other objects and advantages are attained by the means described herein and illustrated upon the accompanying drawings, in which:

FIG. 2 is a diagrammatic view of a hydraulic drive system for two opposed headstock spindles of the lathe shown in FIG. 1.

FIG. 3 is an end elevation, taken on line 3—3 of FIG. 4, showing a frictional drive means for a workpiece, applied to a headstock spindle.

FIG. 4 is a fragmentary vertical cross-section taken on the spindle axis of FIG. 3.

Figure 1:
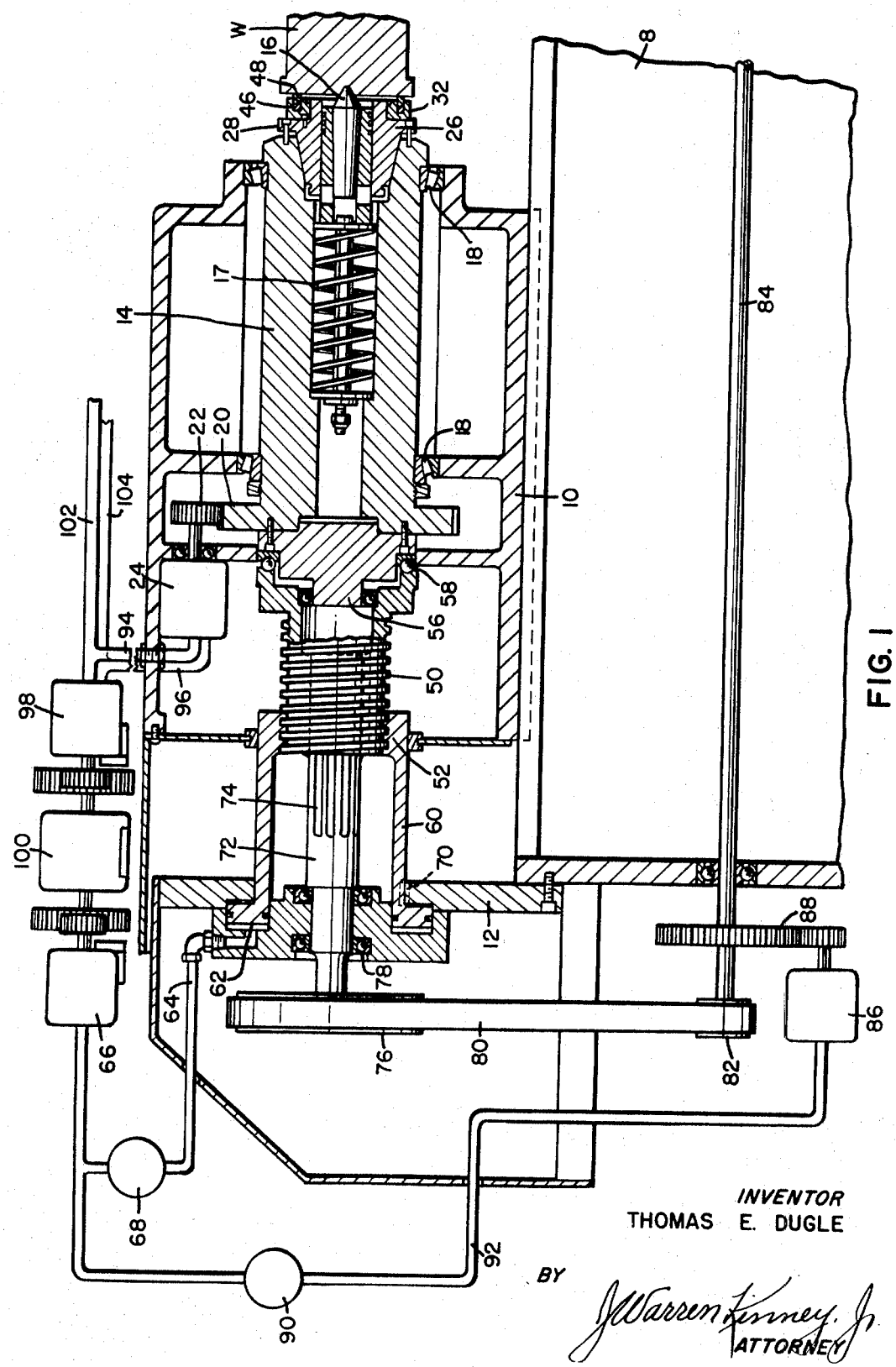
FIG. 1 is a vertical cross-section of one end of a turning lathe, disclosing the improvements of the present invention.

In the machining of heavy workpieces such as railway can axles with the wheels removed, it is desirable to support and rotationally drive both ends of the workpiece with equalized torque forces, and without the use of chucking devices which might mark or indent the finish of the workpiece. It is therefore desirable to transmit rotation of the spindles to opposite ends of the workpiece by frictional means abutting the workpiece ends with great force, and to do this with safety and facility, notwithstanding the possible presence of irregularities in the workpiece end faces. Inasmuch as machining of the journal bearings and wheel seats of an axle imposes considerable resistance to rotation of the axle, any frictional driving means therefor must be durable and highly effective in resisting slippage and lateral displacement of the axle.

With reference to FIG. 1, the lathe comprises a bed 8 having ways to support a headstock 10 which is slidable lengthwise a limited distance along the bed. Behind the headstock and upon the bed is fixed a subhead comprising housing 12, which contains power means for axially shifting the headstock and spindle 14, as is necessary in the placement and removal of workpiece W. It must be understood that the lathe bed carries two headstocks, one near each end of the bed, and each of which headstocks includes a driving spindle operative to rotate the workpiece. The workpieces have, or may be caused to have coaxial sockets at the opposite ends thereof to accommodate the spindle centers 16 of both headstocks. The center 16 may enter a socket more deeply then the drawing indicates. Both centers are to be spring-loaded, as at 17.

From the foregoing explanation, it will be understood that the workpiece is to be supported between centers of two headstocks while undergoing machining, and upon completion of the machining operation the headstocks and their spindles may be retracted to release the workpiece which then may be lifted away from the work position and conveyed from the vicinity of the machine. Workpieces in the form of railway car axles may weight more than 1,000 pounds.

Spindle 14 may be journalled for rotation in suitable bearings 18, 18 supported by the headstock, and at one end of the spindle may be fixed a gear 20 in mesh with the driving pinion 22 of a hydraulic pump-motor 24 carried by the headstock. The forward end of the spindle carries an adapter 26 (FIG. 4), which adapter is formed with a flange 28 and an annular shoulder 30. Adapter 26 rotates with the spindle 14, and provides support for the spindle.

About shoulder 30 and in abutment against flange 28 is positioned a removable drive ring 32. To assure rotation of the drive ring with driving adapter 26, the adapter may be provided with one or more fixed studs each having a head 34 projected into a socket 36 formed in a rear face 38 of the drive ring. To preclude inadvertent axial displacement of the drive ring from shoulder 30, a snap ring 40 or equivalent means may be employed for detachably joining the parts.

In the forward face 42 of drive ring 32 is formed an annular groove 44 in which is mounted the means previously mentioned for frictionally driving the workpiece W. Said means comprises a completely confined back-up ring or pad 46, and a superposed load ring or pad 48 which extends slightly beyond face 42 to abut an end face of the workpiece W under high pressure. This abutting relationship between ring 48 and an end face of the workpiece, constitutes the friction drive means for the workpiece.

The load ring 48 is to be formed of a hard and durable material which is relatively incompressible, like a ring of steel or other metal. To a limited extent said ring may be flexible or bendable.

The load ring is to be backed up by a much softer ring 46, formed of a material having certain characteristics found in soft polyurethane, for example. The back-up ring is required to act as a liquid or heavy grease entrapped behind the load ring, in that slight tilting or bending of the load ring resulting from irregularities in the workpiece end face, will effect a displacement of the back-up material within the groove 44, resulting in substantially uniform distribution of pressure throughout the mass of the back-up material. The same effect might be obtained by filling the space behind the load ring with a multiplicity of ball bearings, which would act in much the same manner as a liquid, to compensate for tilt or bending of the load ring pressed against a workpiece end having a surface which may be wavy or slightly out of square with the workpiece axis.

The soft back-up ring 46 may be formed of polyurethane, or a material of the class of soft polyurethane, having a hardness of the order of Shore A–60 durometer. The material is substantially incompressible, though deformable or fluid-like in performance under conditions of unequal force application thereon. It is displaceable in all directions under localized application of pressure, and uniformly self-equalizing in much the manner of a liquid.

The hard ring or load ring 48, as before stated, is to be formed of a hard, durable, substantially incompressible material, having limited flexibility and resilience characteristics by preference. The load ring has an outer friction face to abut the workpiece, and under some conditions, the friction face might be roughened or otherwise treated to increase the frictional grip of the load ring upon the workpiece.

A satisfactory and highly effective load ring may be formed of hard polyurethane, or a material of the class of a polyurethane, having a hardness of the order of Shore D-70 durometer. Such material is substantially incompressible, slightly flexible, very durable, and has a high coefficient of friction.

Ring 48 is precluded from rotation within groove 44, by a circular row 47 of interfitting splines or keys formed in the groove 44 and upon an adjacent edge of ring 48.

The transmission rings 46 and 48 cooperate with one another to maintain a high-friction abutment against the end face of the workpiece, irrespective of irregularities that might be present in said end face. Sometimes the end face of the workpiece is found to be curved, or rippled, and in some cases the plane of the end face is not truly perpendicular to the major axis of the workpiece. Such imperfections, in the absence of correctional compensation as furnished by the different types of rings 46 and 48, may cause a drive failure destructive of cutting tools and disruptive to production schedules. The cooperative hard and soft transmission rings supported by the drive ring as disclosed, assure maintenance of a highly effective and reliable non-slip frictional drive between the headstock spindles and opposite ends of the workpiece. Should the transmission rings ever require replacement, they may easily be removed from the groove 44; or if preferred, replacement may be effected by substituting a new drive ring 32 for the one carrying worn transmission rings, this being easily accomplished by removing the snap ring 40.

Reverting to FIG. 1, it is clearly apparent that a bodily shifting of headstock 10 to the right will result in establishing the aforementioned frictional drive for rotating the workpiece. Such shifting of the headstock may be performed by means of a screw 50 and a nut 52, arranged to selectively vary the distance between the movable headstock 10 and the fixed sub-head 12.

Screw 50 has exterior threads as shown, and is in the form of a sleeve having an elongate axial bore containing longitudinal internal splines engaging the external splines 74 of a shaft 72. The sleeve screw may be mounted upon a stud end 56 of the spindle so as to have rotational movement independent of rotation of the spindle, or, immobility as the spindle rotates. The sleeve screw may impart longitudinal movement to the spindle through a thrust bearing connection 58.

The internal threads of nut 52 are in constant engagement with the external threads of screw 50, and the nut may be integral with, or fixedly supported within, a non-rotative sleeve 60 to be shifted longitudinally by the action of hydraulic fluid under high pressure fed to a chamber 62 at the back of the sleeve. Fluid under high pressure may be fed to chamber 62 through a tube 64 supplied by a pump 66 and controlled by a valve 68. Sleeve 60 acting as a piston may be keyed to housing 12 as at 70, in such manner as to prevent rotation of the sleeve while permitting limited axial shifting thereof. Axial shifting of sleeve 60 as a piston bodily moves the headstock 10 and spindle 14.

The headstock and spindle are shiftable also by rotation of screw 50 within the nut 52. Rotation of screw 50 may be effected by means of a propeller shaft 72 having external splines 74 at one end thereof in engagement with the internal splines of the screw. Housing 12 supports the propeller shaft for rotation in suitable bearings 78. A sprocket 76 is fixed to the rear end of shaft 72, and over the sprocket may be trained a chain or timing belt 80 driven by a second sprocket 82.

Drive sprocket 82 may be fixed upon a torque tube 84 which reaches beyond the workpiece and terminates near the opposite end of the lathe bed. The torque tube may be rotated at times by means of a reversible fluid motor 86, through a transmission train 88 of any suitable type. Operating fluid may be supplied to motor 86 through a control valve 90 and appropriate piping 92. As will be understood, the shaft of motor 86 when rotated in one direction will effect rotation of propeller shaft 72 to advance screw 50, spindle 14, and headstock 10 to the right in FIG. 1; and conversely, an opposite direction of rotation of said motor shaft will reversely drive the screw 50, to move the spindle and the headstock to the left.

As was previously mentioned herein, that end of the machine not illustrated upon FIG. 1, will be equipped with a slidable headstock identical to headstock 10, and with second sub-head 12 which carries all the elements necessary to shift the headstock by rotation of a propeller shaft such as 72 (see FIG. 2). The second sub-head preferably is simplified to the extent of eliminating the fluid chamber 62 behind nut sleeve 60, so that said sleeve simply is fixedly secured to the second sub-head.

The second sub-head may have its propeller shaft 72 driven from torque tube 84 in the same manner disclosed by FIG. 1, the two propeller shafts thereby operating in synchronism to move the headstocks either toward one another to support the workpiece, or from one another to release the workpiece. This presupposes, of course, screw threads of opposite hands in the screw assemblies associated with the propeller shafts.

From the foregoing, it will be apparent that motor 86 may be energized to effect movement of the two headstocks from one another to permit placement of a workpiece W between the headstock centers. Then by reversing the direction of motor 86, the propeller shafts of the headstocks may be rotated to move the headstocks toward one another, thereby to project the headstock centers into the end sockets of the workpiece. The centers, being spring loaded, may yield to ensure that the end faces of the workpiece firmly abut the load rings 48 of the drive rings 32, under the force of advancement of the headstocks by motor 86.

Motor 86 will advance the headstocks to grip the workpiece primarily with a force limited by the torque capacity of motor 86, and said motor accordingly may stall in the effort to compress the workpiece with sufficient force to ensure an effective drive at the friction rings 48 of the opposing headstocks. However, after the workpiece has been compressed to the extent of the capability of motor 86, valve 68 may be opened to direct a secondary fluid under high pressure to chamber 62, for projecting the sleeve 60 with great force as required for the workpiece machining operation. If necessary, the secondary pressure in chamber 62 may be sustained throughout the machining operation. Also if necessary, the motor 86 may be kept under sustained driving pressure, although in practice this is found unnecessary if the threads at 50, 52 are of proper pitch.

Upon completion of the machining operation, the workpiece may be released by closing the valve 68 and exhausting the chamber 62, and by reversing the direction of motor 86 to retract screw 50 and the headstock and spindle connnected thereto, at opposite ends of the lathe.

The hydraulic pump-motor 24 is driven by fluid under pressure circulated through pipes or conduits 94 and 96 by an electric motor driven hydraulic pump-motor 98, which latter is identical to pump-motor 24 but is driven by electric motor 100. The pipes or conduits have extensions 102 and 104 which connect with a third hydraulic pump-motor 24' carried by the headstock opposite to headstock 10. Said third hydraulic pump-motor is identical to those indicated at 24 and 98, and it drives the opposite end of the workpiece as previously explained.

Since the two headstock pump-motors 24 and 24' are identical in all respects, and are connected in a common fluid-pressure system, said pump-motors will share equally the work of driving opposite ends of the workpiece. That is, the system may be regarded as self-compensating as to the drive for opposite ends of the workpiece, which of course is highly desirable.

The pump-motors 24, 24' and 98, are of the positive displacement type, and are variable as to speed in the system disclosed. All of said pump-motors are sufficiently identical and interchangeable one with another as pumps or as motors, so that in contemplation of a breakdown of any one of them, only one replacement need be kept on hand. This is a matter of economic importance, since the pump-motors are expensive inventory items.

Although the drawings show a geared drive between the electric motor 100 and the pump-motors 98 and 66, a direct drive here will often be preferred. Also, these pump-motors may be driven by separate electric motors if desired.

Since the pump-motors 98 and 66 and the driving means therefor are to be mounted elsewhere than upon the movable headstocks, as may well be preferred, some portions of the fluid conduits shown will of course be of the flexible type, as will be understood. The fluid system employed in driving the spindles may be kept supercharged by incorporating suitable pump means, not shown.

It is to be understood that various modifications and changes may be made in the structural details of the apparatus, within the scope of the appended claims, without departing from the spirit of the invention.

What is claimed is:

1. A lathe for machining a heavy elongate workpiece having opposite substantially planar end faces each provided with a socket coaxial with the workpiece major axis, said lathe comprising: a stationary elongate bed having opposite end portions; a pair of headstocks slidably supported near opposite end portions of the bed for shifting movement toward and from one another; a drive spindle journalled for rotation in each headstock, said spindles each having a forward spring-loaded center to enter a socket of a workpiece end face for support of the workpiece axially between the spindles; means precluding axial shifting of the spindles relative to their respective headstocks; frictional drive means on the spindles adjacent to the centers thereof, for frictionally abutting the opposite end faces of the workpiece; motor means for rotating the spindles and the abutting workpiece; a pair of sub-heads fixed upon the bed outboard of the headstocks; a pair of interconnected screw-threaded members located between each sub-head and its adjacent headstock, one of said members being mounted axially in abutment against the rear end of a spindle for rotation independently of the spindle rotation; the other of said screw-threaded members being non-rotatably mounted upon a sub-head in alignment with said one member; a rotatable shaft coaxial with said screw-threaded members and means on said shaft for transmitting rotation of said shaft to said one member relative to said other member; power means reversible for rotating the shafts of said sub-heads in unison, thereby to rotate said one screw-threaded member of each spindle relative to said other interrelated screw-threaded member, for advancing and retracting the shiftable headstocks relative to their respective adjacent sub-heads; and high-pressure hydraulic means selectively operative to augment the force applied to advance one of the headstocks by relative rotation of the screw-threaded members associated with said one headstock.

2. The lathe as specified by claim 1, wherein the said high-pressure hydraulic means is operative upon one of said screw-threaded members, for applying auxiliary force axially to a spindle and a workpiece end face abutting said spindle.

3. The lathe as specified by claim 1, wherein the said high-pressure hydraulic means is operative upon the non-rotatable screw-threaded member to shift the latter member in the direction of a workpiece end face.

4. The lathe as specified by claim 1, wherein the mounting for the non-rotatable screw-threaded member upon the sub-head affords limited axial shifting of said non-rotatable member toward the workpiece, and said high-pressure hydraulic means operates to shift said non-rotatable member within the axial limits afforded by said mounting.

5. The lathe as specified by claim 4, wherein the mounting aforesaid includes a fluid chamber in which a portion of said non-rotatable member is axially shiftable and exposed to pressure of hydraulic fluid introduced into said chamber.

6. The lathe as specified by claim 1, wherein the aforesaid motor means for rotating the spindles comprises a pair of identical hydraulic pump-motors, one mounted upon each headstock, and each including a driving connection with a spindle; and a pipe system common to said pump-motors for supplying thereto a pressured fluid circulation, with pressure self-equalized within said pump-motors to ensure equal sharing of the load imposed upon said pump-motors in driving the workpiece.

7. The lathe as specified by claim 6, wherein the combination includes a third hydraulic pump-motor identical to the spindle-driving pump-motors, said third pump-motor being hydraulically connected in said common pipe system and being driveable as a pump, to supply pressurized fluid to the pump-motors first mentioned; and electric motor means for driving said third pump-motor as a fluid pump.

8. The lathe as specified by claim 5, wherein the aforesaid motor means for rotating the spindles comprises a pair of identical hydraulic pump-motors, one mounted upon each headstock, and each including a driving connection with a spindle; and a pipe system common to said pump-motors for supplying thereto a pressured fluid with pressure self-equalized within said pump-motors to ensure equal sharing of the load imposed upon said pump-motors in driving the workpiece.

9. The lathe as specified by claim 8, wherein the combination includes a third hydraulic pump-motor identical to the spindle-driving pump-motors, said third pump-motor being hydraulically connected in said common pipe system and being driveable as a pump, to supply pressurized fluid to the pump-motors first mentioned; and electric motor means for driving said third pump-motor as a fluid pump.

10. The lathe as specified by claim 1, wherein the frictional drive means on the spindles comprise hard and soft laminations of a material of the class of polyurethane, said laminations being compressible between each spindle and an adjacent end face of the workpiece, with a hard lamination in contact against each workpiece end face.

11. The lathe as specified by claim 10, wherein the hard and soft laminations possess a hardness approximating Shore D–70 durometer, and a hardness approximating Shore A–60 durometer, respectively.

12. The lathe as specified by claim 1, wherein the frictional drive means on the spindles comprise each a hard load ring, and a soft back-up ring formed on a substantially incompressible material having the property of being displaceable in all directions under localized pressure to distribute a load uniformly within itself, said rings being compressible between each spindle and an adjacent end face of the workpiece, with a hard ring in abutment upon each workpiece end face.

* * * * *